J. H. WRIGHT.
CULTIVATOR SHOVEL.
APPLICATION FILED JUNE 19, 1915.

1,160,027.

Patented Nov. 9, 1915.

WITNESSES:
John K. Phillips
Alan T. Garner.

INVENTOR
JOHN H WRIGHT,
BY Munn & Co.
ATTORNEYS

UNITED STATES PATENT OFFICE.

JOHN H. WRIGHT, OF JEFFERSON, IOWA.

CULTIVATOR-SHOVEL.

1,160,027.  Specification of Letters Patent.  Patented Nov. 9, 1915.

Application filed June 19, 1915.  Serial No. 34,994.

*To all whom it may concern:*

Be it known that I, JOHN H. WRIGHT, a citizen of the United States, and a resident of Jefferson, in the county of Greene and State of Iowa, have invented a certain new and useful Improvement in Cultivator-Shovels, of which the following is a specification.

One of the principal objects of this invention is to provide an improved cultivator shovel of such design that earth and weeds or grass and other matter will be prevented from clogging or sticking upon the shovel, as the latter moves along so that a maximum efficiency is attained in pulverizing the soil.

A further object of the invention is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed and illustrated in the accompanying drawing in which like characters of reference indicate like parts throughout the several figures, of which—

Figure 1:
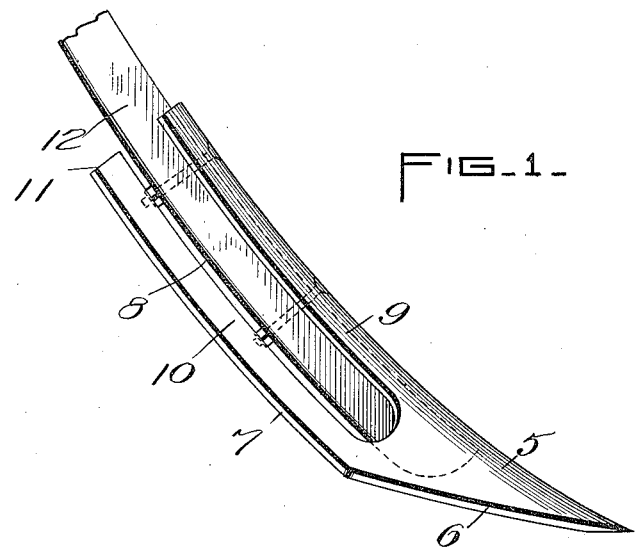
Figure 2:
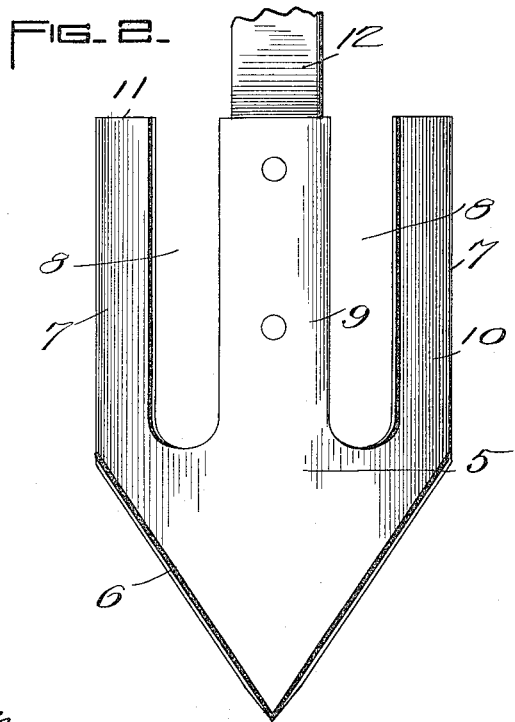

Figure 1 represents a view in side elevation of a cultivator shovel constructed according to my invention showing the same as in place on its standard. Fig. 2 represents a front elevational view of the same.

In carrying out my invention I provide a shovel whose body is indicated generally at 5, the lower end of the shovel being V-shaped or pointed and having converging sharpened edges 6. The shovel is of a concavo-convex formation transversely and the lateral edges 7 of said shovel extend in parallel relation to each other. On both sides of the central longitudinal line of the shovel, are provided the recesses or cut away portions 8 which occur in spaced relation to each other, and which define a central tongue 9 and lateral tongues 10. These tongues lie in parallel and spaced relation to each other. The recesses 8 extend from the upper edge 11 of the shovel downwardly to the body portion 5 thereof and to points approximately on a line connecting the upper ends of the edges 6.

In use the central tongue 9 may be connected in any suitable manner to the standard 12 of the cultivator, so that the tongues 10 lie on opposite sides of the standard and in spaced relation to the central tongue 9. As the cultivator shovel moves along, the earth as it is shifted upwardly upon the front face of said shovel may pass through the recesses 8 and thus the sticking and clogging of earth and clay upon the face of the shovel will be done away with.

Although I have described the preferred embodiment of my invention, I may desire to make such changes in the construction, combination, and arrangement of parts thereof, as do not depart from the spirit of the invention and the scope of the appended claim.

I claim:—

A cultivator shovel comprising a body portion having its lower edge provided with converging cutting edges, and a plurality of tongues extending upwardly from the body portion and in spaced and parallel relation to each other, one of said tongues adapted to be connected with a cultivator standard in order to maintain the cultivator shovel in place thereon, the outside tongues being curved rearwardly toward their outer edge, said outside tongues being provided with outer plain edges lying to the rear of the central portion of the cultivator shovel.

JOHN H. WRIGHT.

Witnesses:
A. D. HOWARD,
A. E. WRIGHT.

Copies of this patent may be obtained for five cents each, by addressing the "Commissioner of Patents, Washington, D. C."